J. W. FRAZIER & F. E. HANSEN.
HOSE CONNECTION.
APPLICATION FILED MAY 12, 1916.

1,295,474.

Patented Feb. 25, 1919.

INVENTORS,
James W. Frazier and
Fred E. Hansen
By Hull, Smith, Brock & West
Attys.

UNITED STATES PATENT OFFICE.

JAMES W. FRAZIER AND FRED E. HANSEN, OF CLEVELAND, OHIO.

HOSE CONNECTION.

1,295,474.

Specification of Letters Patent. Patented Feb. 25, 1919.

Application filed May 12, 1916. Serial No. 96,982.

*To all whom it may concern:*

Be it known that we, (1) JAMES W. FRAZIER, (2) FRED E. HANSEN, citizens of the United States, residing at Cleveland, in the county of Cuyahoga and State of Ohio, have invented a certain new and useful Improvement in Hose Connections, of which the following is a full, clear, and exact description, reference being had to the accompanying drawings.

This invention relates generally to a hose connection for inflating tires and more particularly to certain improvements upon the hose connection shown and described in our application Serial No. 66,415, filed December 13, 1915, and in this application we disclaim anything covered in the aforesaid application.

The object of our present invention is to provide a double ended hose connection whereby a more convenient connection is provided, as it very frequently happens that considerable difficulty is encountered in turning a single ended connection to bring it into engagement with the tire valve stem.

Another object of our invention is to provide a double ended hose connection, in which the valve at one end will act as a stop for the valve at the opposite end.

With these and various other objects in view our invention consists in the novel features of construction hereinafter fully described and pointed out in the claim.

Figure 1:
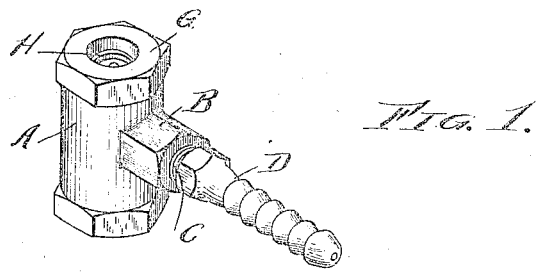
Figure 2:
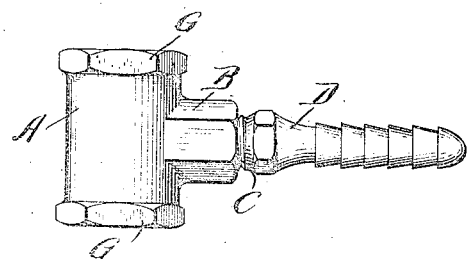
Figure 3:
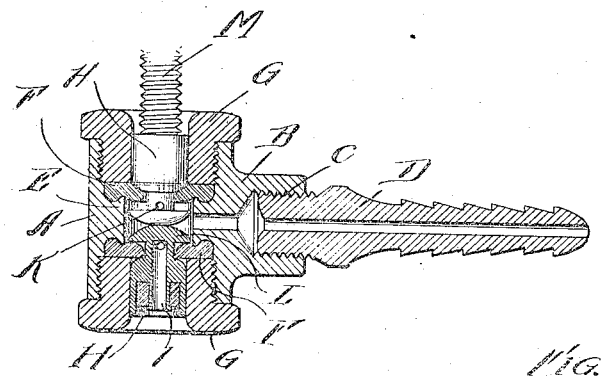

In the drawings forming part of this specification Figure 1 is a detail perspective view of our improved hose connection; Fig. 2 is a side view of the same; and Fig. 3 is a vertical sectional view partly in elevation.

In the practical embodiment of our invention we employ a casing A preferably cylindrical in shape and having a centrally arranged lateral projection B constructed with a central air inlet C, a stem D having a central bore being connected to the extension B by threading or otherwise, or if preferred this stem and extension can be made integral.

The casing provided with oppositely disposed annular valve seats E upon which seat the disk members F of the valves, said disk members being preferably of rubber or other flexible material, but it will be understood that the said disks can be made of any other suitable material if desired.

The disks F are secured in place upon the seats E by means of nuts G, the outer ends of said nuts being preferably hexagonal in shape as shown. Working within each nut and also in the adjacent disk is the movable member H of the valve, each movable member being bored as shown at I and apertured as shown at K and having the cap portion L, substantially the same as shown and described in the application previously referred to.

When the tire valve stem M is inserted in either end of the casing it contacts with the movable member of the valve and forces the same inwardly. This movement tends to slightly flex the disk F and the aperture K is uncovered so that air can pass freely into the stem M through the central passage or bore I and it will be noted that when one valve is forced inwardly the cap portion thereof will contact with the cap portion of the other valve which will act as a stop and prevent any further inward movement, and this pressure upon the second cap tends to hold the unused valve more firmly upon its seat.

It is only necessary to move the central portion of the valve a very short distance and consequently all of the parts are so constructed that these inner ends will be comparatively close together while both valves are in their normal closed positions. By making the connection double ended, and providing two opposed valves, a much more convenient device is provided than one having a single operating end, as with a stiff hose to which the connection is attached it frequently happens that great difficulty is experienced in positioning the connection for receiving the tire valve stem, and this difficulty will be completely avoided by the present construction.

Furthermore the life of the device is practically doubled for the reason that two valves are employed instead of one.

While we have shown one form of device for carrying out our invention it is obvious that certain changes and modifications can be made thereto without departing from the broad principle of the invention within the scope of the appended claim.

Having thus described our invention, what we claim is:—

A casing open at each end and having oppositely disposed valve seats and an air inlet between said seats, oppositely disposed valves arranged in said casing, means arranged at each end of the casing for maintaining said valves in their proper positions, each valve comprising a disk member adapted to be held against the seat, and a bored and apertured member arranged within the disk member and movable with reference thereto, the disk being of flexible material, the inner end of one movable valve member being adapted to contact with the inner end of the opposed valve when the first mentioned valve is opened.

In testimony whereof, we hereto affix our signatures in the presence of two witnesses.

JAMES W. FRAZIER.
FRED E. HANSEN.

Witnesses:
HUGH B. McGILL,
H. K. BELL.